United States Patent [19]

Hoffman et al.

[11] Patent Number: 4,891,749
[45] Date of Patent: Jan. 2, 1990

[54] MULTIPROCESSOR STORAGE SERIALIZATION APPARATUS

[75] Inventors: Roy L. Hoffman, Pine Island; Merle E. Houdek; Frank G. Soltis, both of Rochester, all of Minn.

[73] Assignee: International Business Machines Corporation, Armonk, N.Y.

[21] Appl. No.: 479,281

[22] Filed: Mar. 28, 1983

[51] Int. Cl.$^4$ ............................................. G06F 15/16
[52] U.S. Cl. ................................. 364/200; 364/228.2; 364/228.3; 364/259.2
[58] Field of Search ... 364/200 MS File, 900 MS File

[56] References Cited

U.S. PATENT DOCUMENTS

| | | | |
|---|---|---|---|
| 3,469,239 | 9/1969 | Richmond et al. | 364/200 |
| 4,037,215 | 7/1977 | Birney et al. | 364/200 |
| 4,099,243 | 7/1978 | Palumbo | 364/200 |
| 4,104,718 | 8/1978 | Poublan | 364/200 |
| 4,318,182 | 3/1982 | Bachman et al. | 364/200 |
| 4,325,116 | 4/1982 | Kranz et al. | 364/200 |
| 4,408,274 | 10/1983 | Wheatley et al. | 364/200 |
| 4,415,972 | 11/1983 | Adcock | 364/200 |
| 4,435,766 | 5/1984 | Haber et al. | 364/200 |
| 4,445,197 | 4/1984 | Lorie et al. | 364/200 |

*Primary Examiner*—Raulfe B. Zache
*Assistant Examiner*—William C. Niessen
*Attorney, Agent, or Firm*—Bradley A. Forrest

[57] ABSTRACT

Storage serialization apparatus in a multiprocessor computer system enables multiple processors to concurrently execute instructions which access storage without materially affecting performance by keeping the amount of storage locked to a minimum, i.e., a page. The duration of serialization need be only for one instruction execution time and only instruction operands need be accommodated for serialization. Each storage request is intercepted by an associative register stack where there are two registers for each operand, one of the two being for operand page crossings. After a processor has locked access to an area of storage, execution of the instruction begins and all other processor are locked out but only with respect to that locked area. Other processors can access other storage areas during the instruction cycle. When the execution of the instruction completes, the processor releases the locked area of storage by invalidating the entries in its associative register array. A mechanism arbitrates and breaks possible deadlocks.

3 Claims, 3 Drawing Sheets

MULTIPROCESSOR STORAGE SERIALIZATION APPARATUS

BACKGROUND OF THE INVENTION

1. Field of the Invention

This invention relates to multiprocessor computer systems and more particularly to storage serialization apparatus for enabling the multiprocessors to concurrently execute instructions.

The invention finds particular utility in a tightly coupled multiprocessor computer system having virtual storage.

2. Description of the Prior Art

A storage access serialization mechanism, as distinguished from a storage protection mechanism, operates in a manner where if two or more processors are attempting to update the same storage location, the modification by one processor is not lost by simultaneous modification by another processor. One processor is allowed to complete its storage access of the storage location being simultaneously accessed and all other processors are locked out from accessing that location until the granted access is complete. In a multiprocessor system there can be an active task for each processor with each independently and asynchronously executing an instruction stream without communication between the processors at the instruction level. If all or most of the instructions executing require serialization of access of the entire storage, performance approaches that of a uniprocessor computing system.

Serialization mechanisms in the past have restricted access of the entire storage to one processor during execution of an instruction. Because of this, the performance of the multiprocessor system is severely impacted. Prior art of this type is represented by an article entitled, "Shared Storage For Multiple Processors" published in the IBM Technical Disclosure Bulletin, Volume 23, No. 5, dated October 1980, pages 1801–1804 inclusive. This contrasts to the present invention where all instructions when fetching operands from storage impose locks on pages and while a lock is placed on the operands of one instruction by a processor, the other processors can continue instruction execution without any delays if different pages in storage are being accessed. It is only when a page is to be accessed and another processor already has a lock on that page that execution delays are encountered. It is unnecessary for the programmer to program special locking instructions to ensure the integrity or atomicity of an instruction.

Prior art which protects storage locations from unauthorized access is represented by U.S. Pat. No. 3,264,515 for Memory Protection System by R. P. Case, et al., dated Aug. 2, 1966. The present invention does not provide for or preclude a protected area of storage. There is no provision to prevent an instruction stream from accessing unauthorized data. The present invention provides a serialization function whereby when one or more processors are attempting to access the same storage location at the same time, one processor is locked out until the other completes its access.

SUMMARY OF THE INVENTION

The principal objects of the invention are to provide storage serialization apparatus in a multiprocessor computer system which (a) locks only a portion of storage and (b) locks a portion of storage only for one instruction execution time.

These objects are achieved by having each instruction impose a lock on storage pages containing the operands of the instruction and allowing other processors to execute instructions without any delays unless an instruction being executed by one processor requires access to a page locked by an instruction of another processor. At the end of an instruction; the page or pages being locked by that instruction are unlocked.

DETAILED DESCRIPTION OF THE INVENTION

Figure 1:
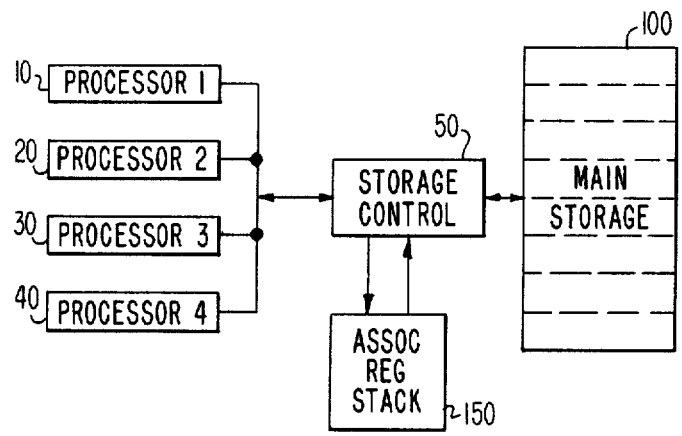
FIG. 1 is a block diagram illustrating the invention as incorporated in a multiprocessor computer system.

With reference to the drawings and particularly to FIG. 1, the invention is shown by way of example as being incorporated into a multi-processor computer system which can be of the type shown and described in commonly assigned co-pending patent application, Ser. No. 260,543 by Roy L. Hoffman, et al., filed May 4, 1981 for Multiprocessor Task Dispatching Apparatus. In FIG. 1, processors 10, 20, 30 and 40 can concurrently execute instructions which access storage 100 via storage control 50. For simplification purposes, the input/output devices and channels associated with each of the processors are not shown but are considered as being included with the processors. Main storage 100, in this particular example, is addressed virtually by the processors and each processor includes a virtual address translator which translates the virtual address into a real main storage address. Main storage 100 consists of a predetermined number of page frames, which in this example correspond in size to a 512 byte page of the virtual storage. Virtual storage and virtual addressing concepts are well known in the art. Any byte of data in a program in process in the processors has two addresses, i.e., a virtual address and a real address. During the processing of a program any page or 512 byte block can be paged out of main storage 100 to auxiliary storage in the processor and subsequently paged into a new main storage location any number of times before the processing of the program is completed. Hence, while the virtual address of a byte of data remains unchanged, the real main storage address can change many times during the processing or execution of the program.

Each main storage request made by the processors is intercepted by associative register stack 150. The addresses of the pages or pieces of storage being used by each of the processors 10, 20, 30 and 40 are held in the associative register stack 150 whereby a record is maintained of the pages each processor has exclusive use. In the present invention, the duration of serialization is for one instruction execution time. Instruction fetch does not require serialization of main storage 100 because a processor is reading and not writing. Only instruction operands need be serialized. In this example, an instruction can have two operands and either operand can be up to 256 bytes in length. Thus either operand can occupy part of two pages. Consequently the associative register stack for each processor includes four registers and are represented by register blocks 160, 170, 180 and 190 to correspond with processors 10, 20, 30 and 40 respectively, FIG. 3.

Figure 2:
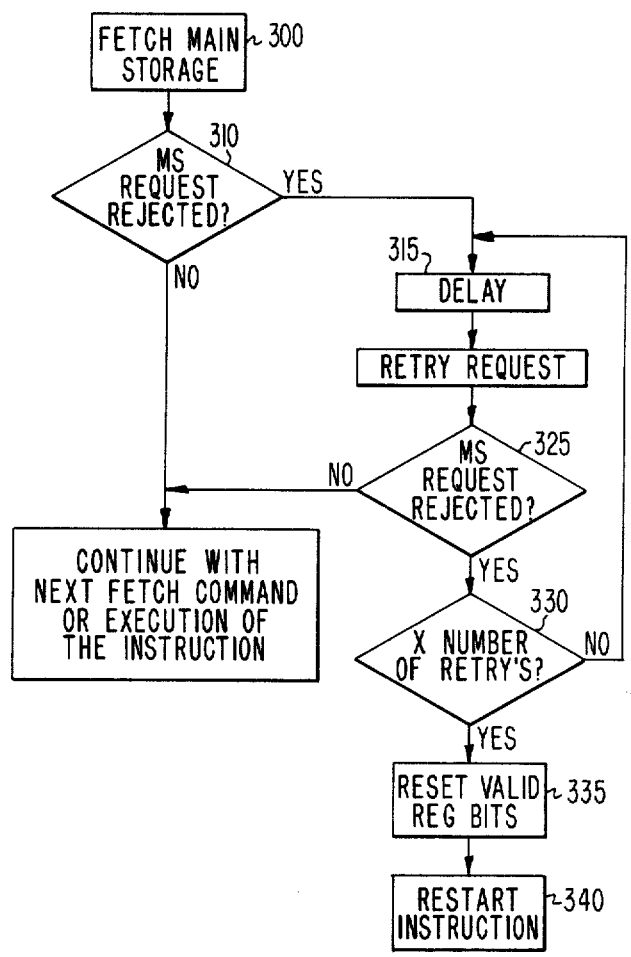
FIG. 2 is a flow diagram illustrating the logic for arbitrating and breaking possible deadlocks.

It is possible that a deadlock can occur between two of the processors 10, 20, 30 or 40, because both can request exclusive use of the same page of storage, the logic for arbitrating and breaking possible deadlocks is represented in FIG. 2. If a deadlock occurs between two of the processors, the storage request command will be rejected X number of times. The processor will then release the locks already held by removing the entries in the associative register array and then restarts the instruction. Each of the processors 10, 20, 30 and 40 can be given a different value X depending upon its processor ID and this will prevent a repeat of the deadlock.

After an instruction is fetched, then operand 1 of the instruction is fetched and an entry is made in the related register array of the register arrays 160, 170, 180 and 190. If a page crossing is detected while fetching operand 1, an entry is made into the operand 1 page crossing register in the register block. Operand 2 is then fetched and an entry is made in the associative register array. If operand 2 crosses a page, then an entry is made in the operand 2 page crossing register of the associative register array block. Only when all operands are successfully locked by entries in the associative register array block for that particular processor, then execution of the instruction proceeds. In FIG. 2, if the main storage request were rejected as determined by block 310, then after a delay as indicated by block 315, the main storage request would be retried as indicated by block 320. A test is again made to determine if the main storage request was rejected as indicated by block 325. If the main storage request is rejected, block 330 determines if there have been X number of retries. If there have been X number of retries, then the valid register bits as will be described later herein are reset as indicated by block 335 and the instruction is restarted as indicated by block 340. If an instruction does complete successfully, the processor in which the instruction is executing releases all locks on main storage for that instruction by invalidating the entries in the related associative register array.

Figure 3:
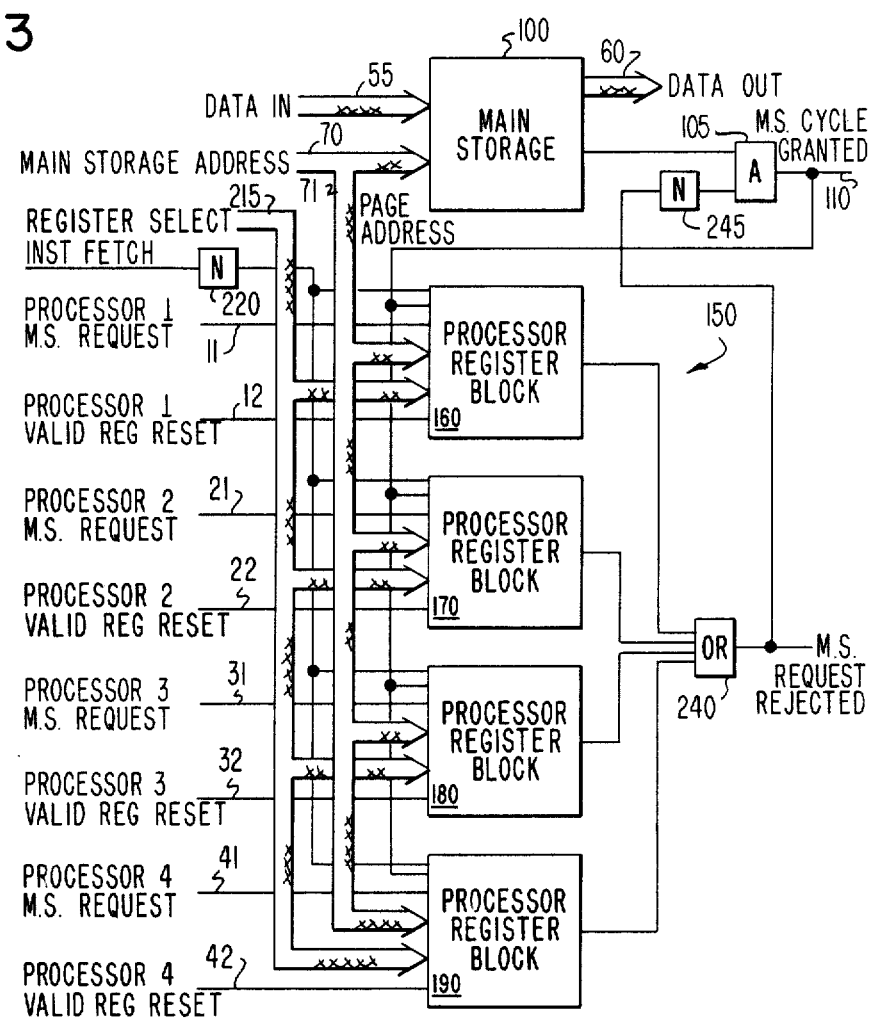
FIG. 3 is a block diagram illustrating main storage and processor register blocks for each processor of the multiprocessor system; and, FIG. 4 is a logic diagram showing the registers and logic of a processor register block in FIG. 3.

In FIG. 3, data is entered into main storage 100 over Data In bus 55 from storage control 50, FIG. 1 and data is read from main storage 100 to one of the processors via storage control 50 over bus 60. During the reading and writing of data the main storage addresses are applied to main storage 100 from storage control 50 via main storage address bus 70. The page portion of the main storage address is also applied via bus 71 to processor register blocks 160, 170, 180 and 190, FIG. 3. When an instruction address is passed by one of the processors onto the main storage address bus 70, the processor also activates an associated main storage request line such as lines 11, 21, 31 and 41 for processors 10, 20, 30 and 40 respectively.

Figure 4:
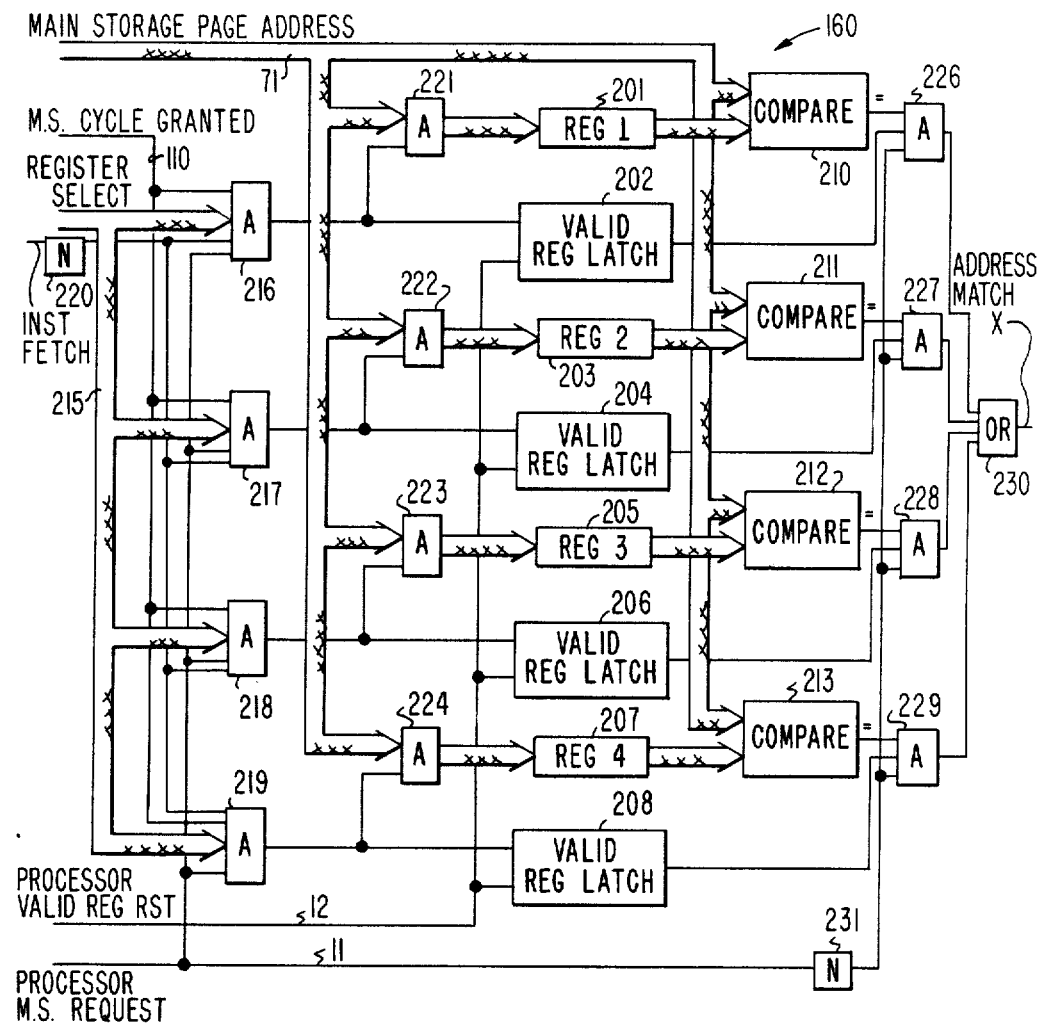

The processor register blocks 160, 170, 180 and 190 are identical and the details of block 160 are shown in FIG. 4. The processor register block 160 contains four registers 201, 203, 205 and 207, two of the registers being for operand 1 and two for operand 2. The register blocks 160, 170, 180 and 190 function in a manner where the register block associated with the processor making the storage access request forces a non-address match by inhibiting the AND circuits, in the case of block 160, AND circuits 226, 227, 228 and 229, which are fed by comparators 210, 211, 212 and 213 respectively. Comparators 210, 211, 212 and 213 compare the page addresses in registers 201, 203, 205 and 207 with the page address on bus 71. These comparisons are inhibited by the processor main storage request signal via an inverter, and in the case of register block 160, inverter 231. The comparisons in the register block for which the main storage request is made are in essence ignored, in other words a no address match condition is forced by the Processor M.S. Request signal. The comparisons in the other register blocks; however, are not ignored because the Processor M.S. Request signal will not be active, and if there is an address match or compare, then the main storage access will not be granted. If there is no address match or compare, the main storage access is granted and the page address for that main storage access is written into the selected register of the register block for the processor making the main storage access request, unless the main storage access request was for an instruction fetch.

The writing of the page address into the selected register is controlled by two groups of AND circuits, FIG. 4. The page address is applied to AND circuits 221, 222, 223 and 224 which are representative of AND circuits for the bits of the page address. These AND circuits have their outputs connected to registers 201, 203, 205 and 207 respectively and are conditioned by outputs of AND circuits 216, 217, 218 and 219 respectively. Register selection is accomplished via the AND circuits 216, 217, 218 and 219 which are representative of AND circuits having inputs from register select bus 215. These AND circuits are inhibited by the instruction fetch INST FETCH signal via inverter 220 and are conditioned by the M.S. Cycle Granted signal from AND circuit 105, FIG. 3, on line 110. The Processor M.S. Request signal also must be present for these AND circuits to have an output. Hence, the page address is only written into the selected register in the absence of an instruction fetch of the register block associated with the processor making the main storage access request.

When a page address is entered into the selected register an associated valid register latch of Valid Register latches 202, 204, 206 and 208 is set. The set outputs of these latches are applied to inputs of AND circuits 226, 227, 228 and 229 respectively. The Valid Register latches are essentially the storage access locks and must be reset by a processor at the end of instruction execution cycle. This is accomplished by the processors 10, 20, 30 or 40 activating their Processor Valid REG RST signals on lines 12, 22, 32 and 42 respectively.

The operation of the associative register stack 150, FIGS. 1, 3 and 4 will be described with an instruction execution sequence. An instruction address is passed by one of the processors 10, 20, 30 or 40 via storage control 50 to main storage 100 over the main storage address bus 70. The Valid Register latches in the processor register blocks 160, 170, 180 and 190 are initially all reset and thus the output from OR circuit 230 in the case of register block 160 and similar OR circuits for register blocks 170, 180 and 190 and thus the output of OR circuit 240, FIG. 3, will be inactive or at a level whereby inverter 245 conditions AND circuit 105 which then passes a M.S. Cycle Granted signal on line 110. The processor presenting the main storage address on bus 70 also provides a main storage request signal, for processor 10 for example, on line 11. A comparison is made between the contents of the registers of the register blocks with the main storage page address on bus 71 to determine if the page portion of the address is contained in any of these registers. With all of the Valid Register latches in a register block reset, there will be no comparison and the main storage cycle will be granted. The instruction fetched from main storage 100 is sent to the requesting processor via the data bus out 60 along with the indication from AND circuit 105 indicating that the main storage cycle was granted. Because an instruction is being fetched from storage no entry is made into the registers of the register block associated with the processor making the main storage request.

The processor which received the instruction starts the execution of that instruction by initiating an operand fetch. The address of the operand is placed on the main storage address bus 70 and the appropriate main storage request line is made active. The address for one of the registers into which the page address is to be written is placed on the register select bus 215. An address comparison is made in the register blocks for all processors and assuming no matches, the operand 1 data is sent to the processor executing the instruction via data out bus 60 together with the signal from AND circuit 105 indicating that a main storage cycle is granted. This time, however, the address of operand 1 is entered into the register associated with that operand. Additionally, the associated valid register latch is set.

The processor executing the instruction then continues with fetching the second portion of operand 1 if operand 1 crosses a page boundary or fetches operand 2. The address for fetching the second part of operand 1 or for fetching operand 2 will not compare with the address stored in the register associated with the first part of operand 1. For each of the operand fetches, the page portion of the address is placed in the appropriate registers of the register block.

During the instruction execution, as the addresses contained in these registers are being used by the processor, processor 10 for example, the comparators 210, 211, 212 and 213 will indicate address matches however theses match indications will be nullified by inverter 231 because the addresses are valid for use by processor 10 but are not valid for use by processors 20, 30 and 40. Thus it is seen that a non-compare is forced in the processor register block for the processor requesting a main storage access but the comparisons in the other processor register blocks 170, 180 and 190 are tested because there will be an absence of a main storage request signal on the main storage request lines 21, 31 and 41. Thus the main storage cycle is granted to the processor making the main storage request. This main storage cycle granted signal is then said to load the main storage address into one of the registers of the processor register block associated with the processor requesting the main storage access and in this instance processor register block 160 provided the main storage request which was not for an instruction fetch.

The AND circuits 216, 217, 218 and 219 for processor register block 160 are conditioned by the main storage request signal on line 11 and at this time are not inhibited by the instruction fetch signal via inverter 220. One of the AND circuits 216, 217, 218 or 219 will be conditioned and selected based upon the selection made via the register select bus 215 whereby one of the AND circuits 216, 217, 218 or 219 passes a signal to condition the associated AND circuit of AND circuits 221, 222, 223 and 224 and sets the associated Valid Register latch of the valid register latches 202, 204, 206 and 208. The register associated with the conditioned AND circuit will receive the page address of the main storage address and with the associated valid register latch set, any subsequent comparison will be tested unless that comparison is in the processor register block for the processor making the main storage request. However, if during execution of the instruction by processor 10 one of the other processors 20, 30 or 40 made a main storage request using an address which was the same as the address stored in one of the registers 201, 203, 205 or 207 then there would be a comparison and the AND circuit of the AND circuits 226, 227, 228 or 229 associated with the set valid register latch would pass a signal indicating an address match and this signal would be passed by OR circuit 240 of FIG. 3 indicating a main storage request rejected condition.

It should be noted that the M.S. Request Rejected signal would only be generated if processor 10, in this instance, was not finished with the execution of the instruction it had been executing. When processor 10 finishes with the instruction it had been executing, it presents a Valid Register Reset signal on line 12 for resetting all of the previously set valid register latches 202, 204, 206 and 208. Thus even though there is an address in one of the registers 201, 203, 205 or 207 and a comparison will take place, the result of the comparison will not be tested because the valid register latches 202, 204, 206 and 208 will all be reset and none of the associated AND circuits 226, 227, 228 and 229 will be conditioned. Therefore any address match will be ignored and it is seen that the lock or locks held by processor 10 was for only one instruction cycle and thereafter have been released so that another processor, processor 20 for example, could access the same storage location that had been accessed by processor 10. It should also be noted that during the execution of the instruction by processor 10, if processor 20 for example, had been accessing a location in a page of storage other than one which had been accessed by processor 10 then its storage access would have been granted.

We claim as our invention:

1. Storage serialization apparatus for a multiprocessor computer system including a plurality of processors coupled to a common main storage having a plurality of page portions accessible by at least two processors, the serialization apparatus comprising:

registering means for registering the page portion of a storage address during a granted storage access indicating which page in storage is being addressed, said registering means comprising a first page address register for storing the page address of a first operand or of the first portion of a first operand, a second page address register for storing the page address of the second portion of a first operand, a third page address register for storing the page address of a second operand or of the first portion of a second operand, a fourth page address register for storing the page address of the second portion of a second operand;

comparing means coupled to the registering means for comparing the page portion of a storage address for a subsequently requested storage access with said page portion of a storage address registered by said registering means and providing a comparison signal having a first value when said addresses match and a second value when said addresses do not match, and means coupled to the comparing means for generating a storage request reject signal when said comparison signal has the first value and for generating a storage request granted signal when said comparison signal has the second value such that at least one page portion of storage is locked as a function of granted storage access.

2. The storage serialization apparatus of claim 1 wherein said comparing means comprises a latch for each of said first, second, third and fourth page address registers.

3. The storage serialization apparatus of claim 1 wherein each processor contains a separate registering means, comparing means and means for generating storage requests rejected and granted signals, the apparatus further comprising a register selection bus commonly connected to each processor and to said comparing means of each processor for selecting the page address register of said first, second, third and fourth page address register which is to receive the page address.

* * * * *